United States Patent
Wako et al.

(10) Patent No.: US 7,440,018 B2
(45) Date of Patent: Oct. 21, 2008

(54) DRIVING METHOD OF SOLID-STATE IMAGING APPARATUS AND SOLID-STATE IMAGING APPARATUS

(75) Inventors: Hideki Wako, Miyagi (JP); Katsumi Ikeda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 583 days.

(21) Appl. No.: 11/208,731

(22) Filed: Aug. 23, 2005

(65) Prior Publication Data
US 2006/0038905 A1    Feb. 23, 2006

(30) Foreign Application Priority Data
Aug. 23, 2004    (JP)    ............... 2004-242496

(51) Int. Cl.
*H04N 3/14* (2006.01)
*H04N 5/335* (2006.01)

(52) U.S. Cl. .................. 348/311; 348/303; 348/304

(58) Field of Classification Search ......... 348/294–324; 438/60
See application file for complete search history.

(56) References Cited

U.S. PATENT DOCUMENTS

| | | | |
|---|---|---|---|
| 5,923,370 A * | 7/1999 | Miethig et al. | 348/320 |
| 6,774,350 B2 * | 8/2004 | Okada | 250/208.1 |
| 7,071,977 B2 * | 7/2006 | Yoshihara et al. | 348/243 |
| 7,199,826 B2 * | 4/2007 | Uya | 348/273 |
| 2003/0067550 A1 * | 4/2003 | Inokuma et al. | 348/322 |

FOREIGN PATENT DOCUMENTS

JP    11-261901 A    9/1999

* cited by examiner

*Primary Examiner*—David Ometz
*Assistant Examiner*—Pritham Prabhakher
(74) *Attorney, Agent, or Firm*—Birch, Stewart, Kolasch & Birch, LLP

(57) ABSTRACT

A solid-state imaging apparatus, comprising: a semiconductor substrate defining a two-dimensional surface; a multiplicity of photo electric conversion elements arranged in a plurality of rows and in a plurality of lines in a light receiving region of the semiconductor substrate and each accumulating signal electric charges; a vertical electric charge transfer device having a plurality of vertical electric charge transfer channels arranged vertically between rows of the photo electric conversion elements and a plurality of transfer electrodes horizontally arranged over the vertical electric charge transfer channels, wherein the vertical electric charge transfer device transfers the signal electrical charges accumulated by the photo eclectic conversion elements by setting a transfer line transferring vacant signals on an up stream side in a vertical direction of every transfer line transferring the signal electrical charges; reading out parts, each corresponding to each one of the multiplicity of the photo electric conversion elements and reading out the signal electric charges accumulated in the corresponding photo electric conversion element to the vertical electric charge transfer channels adjoining in a horizontal direction; and a horizontal electric charge transfer device that horizontally transfers the signal electric charges transferred by the vertical electric charge transfer device.

8 Claims, 9 Drawing Sheets

DRIVING METHOD OF SOLID-STATE IMAGING APPARATUS AND SOLID-STATE IMAGING APPARATUS

CROSS REFERENCE TO RELATED APPLICATION

This application is based on Japanese Patent Application 2004-242496, filed on Aug. 23, 2004, the entire contents of which are incorporated herein by reference.

BACKGROUND OF THE INVENTION

A) Field of the Invention

This invention relates to a driving method of a solid-state imaging apparatus.

B) Description of the Related Art

Recently in imaging according to a solid-state imaging apparatus, a kind of line culling that reads a signal line at a fixed interval is executed. For example, as disclosed in Japanese Laid-Open Patent Hei11-261901, it is well known that the solid-state imaging apparatus reads signal electric charges from photoelectric conversion elements to a vertical signal charge transfer device by culling one third of the signal lines in the vertical direction and outputs the read signal electric charges after adding every two lines of them in a horizontal electric charge transfer device.

FIG. 11 is a timing chart showing a driving timing of the conventional solid-state imaging apparatus. FIG. 12 is a diagram for explaining signal charge transfer by the driving timing shown in FIG. 11. On a lower side of the drawing, an enlarged timing chart of timing t1 to timing t5 in the driving timing shown in FIG. 11 is presented, In the drawing, a black part represents an electric potential barrier, a white circle represents an empty signal, a hatched circle represents a signal charge (for example, a red color signal), and a cross-hatched circle represents another signal charge (for example, a blue color signal).

At the timing t1, signal charges are read from the photoelectric conversion elements to the vertical electric charge transfer device by impressing high level (VH) pulse on electrodes V3B and V3A so that the two thirds of the signal lines in the vertical direction are read out. Then, the read signal charges are transferred for two steps to the down stream by the timing t2 by alternatively impressing mid level (VM) and low level (VL) pulses to the electrodes V1B to V4A.

Moreover, a dummy signal and an OB signal are sequentially transferred to an output circuit by the horizontal electric charge transfer device during this period.

Between the timing t2 and timing t3, the signal electric charges are transferred for one step, and one of two read signal lines (on the down stream) is transferred to the horizontal electric charge transfer device. Between the timings t3 and t4, the signal electric charges are transferred for one more step, and the empty signals are transferred to the horizontal electric charge transfer device. Between the timings t4 to t5, the signal charges are transferred for one more step, and another one of two signal lines (on the up stream) is transferred to the horizontal electric charge transfer device, and the signal electric charges on the down stream and the up stream are added in the horizontal electric charge transfer device.

For example, in a case that the electric potential in the vertical electric charge transfer device is not uniformed, and when the signal electric charges are transferred from the vertical electric charge transfer device to the horizontal electric charge transfer device, vertical transfer effectiveness will be lower, and left-behind electric charges may be generated.

In this case, the left-behind electric charges on the down stream transferred to the horizontal electric charge transfer device at the timing t2 in FIG. 11 and FIG. 12 are transferred to the horizontal electric charge transfer device with empty signals transferred to the horizontal electric charge transfer device at the timing t3; however, another left-behind electric charges on the up stream are transferred to the horizontal electric charge transfer device with the signal charge transferred to the horizontal electric charge transfer device later and corresponding to the different color. By this color blending, image defection such as longitudinal line and the like on the image signal to be output is generated, and the image may be confused.

SUMMARY OF THE INVENTION

It is an object of the present invention to provide a solid-state imaging apparatus that can prevent generation of image defection caused by a left-behind electric charge.

According to one aspect of the present invention, there is provided a solid-state imaging apparatus, comprising: a semiconductor substrate defining a two-dimensional surface; a multiplicity of photo electric conversion elements arranged in a plurality of rows and in a plurality of lines in a light receiving region of the semiconductor substrate and each accumulating signal electric charges; a vertical electric charge transfer device having a plurality of vertical electric charge transfer channels arranged vertically between rows of the photo electric conversion elements and a plurality of transfer electrodes horizontally arranged over the vertical electric charge transfer channels, wherein the vertical electric charge transfer device transfers the signal electrical charges accumulated by the photo eclectic conversion elements by setting a transfer line transferring vacant signals on an up stream side in a vertical direction of every transfer line transferring the signal electrical charges; reading out parts, each corresponding to each one of the multiplicity of the photo electric conversion elements and reading out the signal electric charges accumulated in the corresponding photo electric conversion element to the vertical electric charge transfer channels adjoining in a horizontal direction; and a horizontal electric charge transfer device that horizontally transfers the signal electric charges transferred by the vertical electric charge transfer device.

According to the present invention, a solid-state imaging apparatus that can prevent generation of image defection caused by a left-behind electric charge can be provided.

DETAILED DESCRIPTION OF THE PREFERRED EMBODIMENTS

Figure 1:
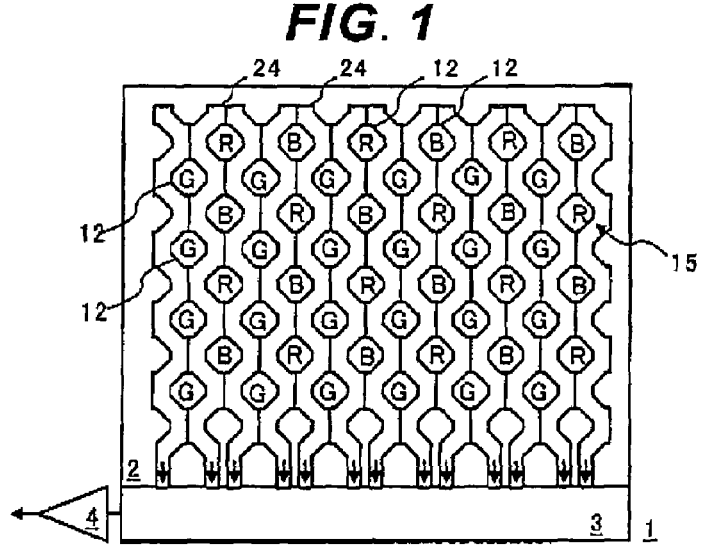
FIG. 1 is a schematic plan view showing a solid-state imaging apparatus 1 according to a first embodiment of the present invention.

FIG. 1 is a schematic plan view showing a solid-state imaging apparatus 1 according to a first embodiment of the present invention.

The solid-state imaging apparatus 1 is consisted of a light-receiving region 2 including a plurality of photoelectric conversion elements 12 and a vertical signal electric charge transfer device (a vertical charge coupled device: VCCD) 24 transferring the signal electric charges generated by the photoelectric conversion elements 12, a horizontal signal electric charge transfer device (a horizontal charge coupled device: HCCD) 3 transferring the signal electric charges transferred by the VCCD 24 to a horizontal direction and an output amplifier 4.

The light-receiving region 2 is consisted of the plurality of the photoelectric conversion elements 12 by configuring them in the so-called pixel interleaved arrangement or the honeycomb arrangement. The pixel interleaved arrangement used in this specification indicates an arrangement combining the first lattice of a two-dimensional tetragonal matrix and the second lattice of the two-dimensional matrix of which each lattice point is positioned at the center of the first lattice. For example, the photoelectric conversion elements 12 in the even numbered rows (lines) or columns and in the odd numbered rows (lines) or columns are shifted in the horizontal direction by about a half pitch of the photoelectric conversion elements 12, and the photoelectric conversion elements 12 in the even numbered lines (rows or columns) and in the odd numbered lines (rows or columns) are shifted in the vertical direction by about a half pitch of photoelectric conversion elements 12, Each row of the photoelectric conversion elements 12 includes the photoelectric conversion elements 12 in either one of the even numbered row and in the odd numbered row. Similarly, each line of the photoelectric conversion elements 12 includes the photoelectric conversion elements 12 in either one of the even numbered line and in the odd numbered line. The pixel interleaved arrangement is one of the arrangement styles for arranging a multiplicity of the photoelectric conversion elements in a matrix having a plurality of rows and lines.

The phrase "about a half" represents a pitch including an exact half pitch and also a pitch regarded as substantially equal to the half pitch from the performance and image quality although this pitch is different from the exact half pitch because of manufacture tolerances, rounding errors of pixel positions caused from design or manufacturing of a mask or the like.

The vertical electric charge transferring device 24 that reads out the signal electric charges generated by the photoelectric conversion elements 12 and vertically transfers them are formed between columns of the photoelectric conversion elements 12 by vertically traversing between spaces of the photoelectric conversion elements 12. Transfer channels 14 are positioned in the zigzag spaces formed by the pixel interleaved arrangement, and the adjacent transfer channels 14 apart from each other via the photoelectric conversion elements 12 and come closer to each other via the channel stop region.

Figure 2:
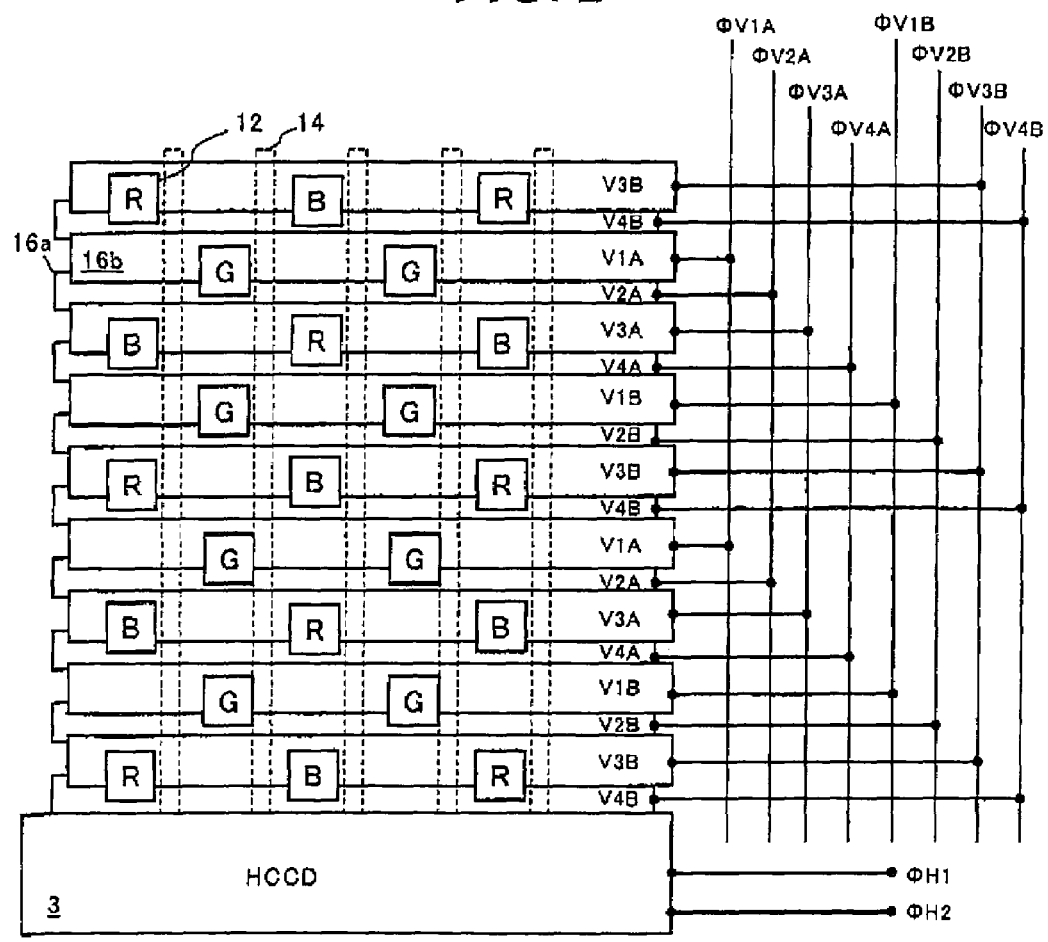
FIG. 2 is an enlarged plan view schematically showing a connecting part of a vertical electric charge transfer device 24 (a transfer channel 14 and a transfer electrode 16) and a horizontal electric charge transfer device 3 in the solid-state imaging apparatus 1 according to the first embodiment of the present invention.

The vertical electric charge transfer device 24 is consisted of the vertical transfer channel 14 shown in FIG. 2 and transfer electrodes 16*a* and 16*b* (FIG. 2) which are formed over the vertical transfer channel 14 via an insulating film (not shown) and traversing between the photoelectric conversion elements 12 to the horizontal direction.

FIG. 2 is an enlarged plan view schematically showing a connecting part of the vertical electric charge transfer device 24 (the transfer channels 14 and the transfer electrodes 16) and a horizontal electric charge transfer device 3 in the solid-state imaging apparatus 1 according to the first embodiment of the present invention.

Each of the vertical transfer channel 14 is formed corresponding to each row of the photoelectric conversion elements 12, and transfers the signal electric charges read out via a reading-out gate channel region (reading part) 15 formed adjoining to each photoelectric conversion element 12 to the vertical direction. A channel stop region is positioned adjoining to the vertical transfer channel 14 on the opposite side of the reading-out gate channel region 15. Moreover, the transfer electrodes 16 (the first layer poly-silicon electrode 16*a* and the second layer poly-silicon 16*b*) are formed over the vertical transfer channel 14 via the insulating film.

The voltage at either one of φV1A to φV4B is supplied to each one of the first layer poly-silicon electrodes 16*a* and the second layer poly-silicon electrodes 16*b*. Hereinafter, in this specification, the first poly-silicon electrode 16*a* and the second layer poly-silicon electrode 16*b* are called as the electrode V1A to the electrode V4B according to the voltage to be supplied.

Figure 3:
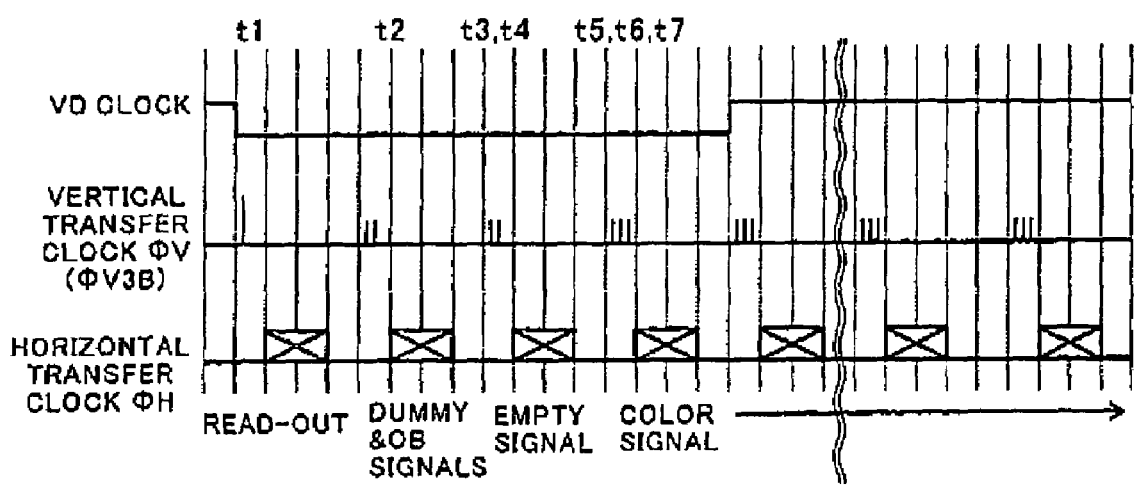
FIG. 3 is a timing chart showing driving timings of the solid-state imaging apparatus 1 according to the first embodiment of the present invention.
Figure 4:
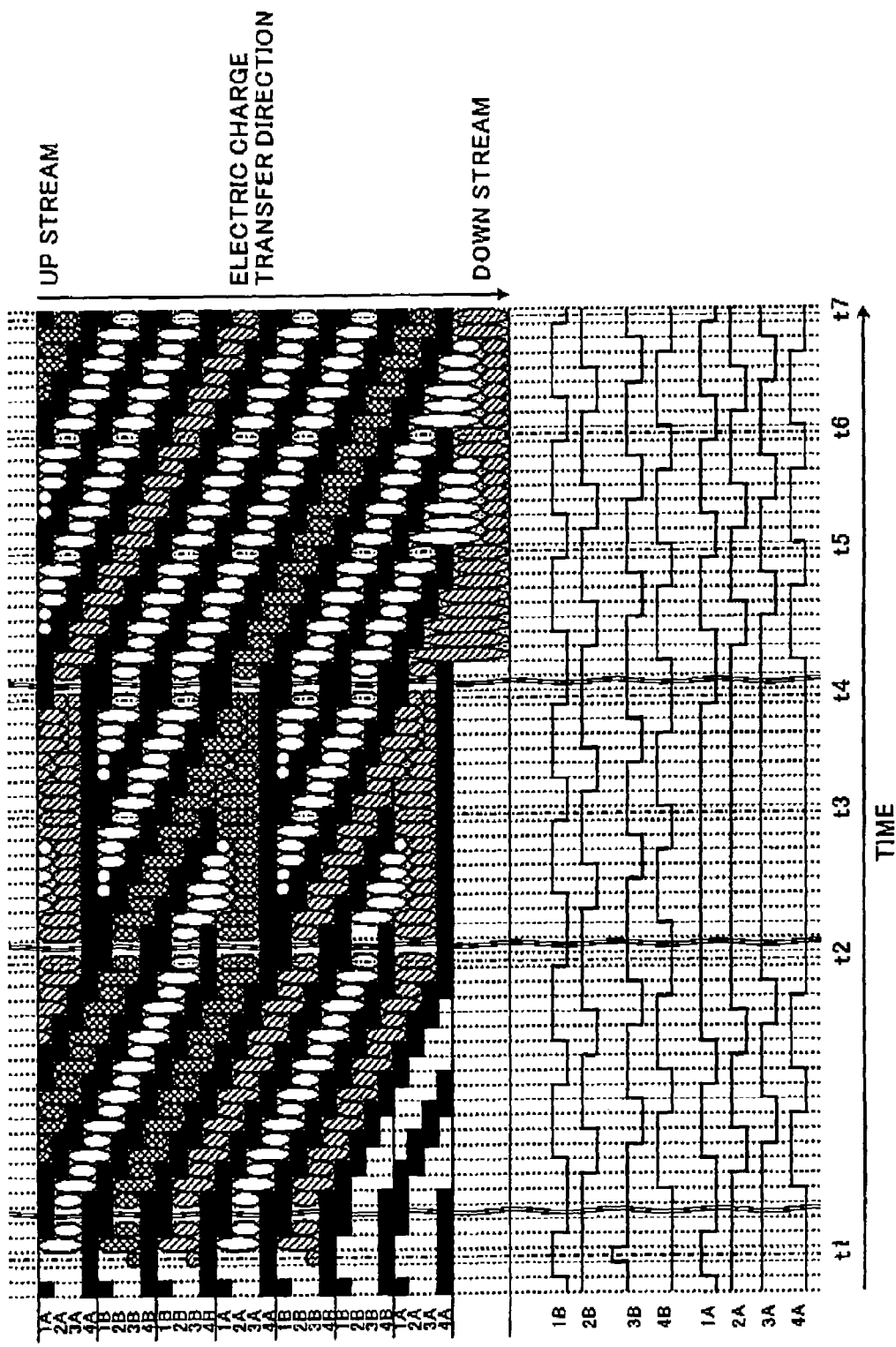
FIG. 4 is a diagram for explaining signal charge transfer by the driving timings shown in FIG. 3.

FIG. 3 is a timing chart showing driving timings of the solid-state imaging apparatus 1 according to the first embodiment of the present invention. FIG. 4 is a diagram for explaining signal charge transfer by the driving timings shown in FIG. 3. On the lower side of the drawing, an enlarged timing chart of the timing t1 to timing t5 of the driving timings shown in FIG. 3 is presented. Moreover, in the drawing, a black part represents an electric potential barrier, a white circle represents an empty signal, a hatched circle represents a signal charge (for example, a red color signal), and a crosshatched circle represents another signal charge (for example, a blue color signal).

Moreover, in this specification, a case wherein a signal electric charge and an empty signal are transferred together as a combination is also called addition.

At the timing t1, the signal charges are read out from the photoelectric conversion elements 12 to the vertical electric charge transfer device 24 via the reading unit 15 by impressing high level (VH) pulse on electrodes V3B and V3A so that one third of the signal lines are culled, i.e., two signal lines (up stream side and down stream side) are read out of every three vertically adjoining signal lines for each color. Then, the read signal charges are transferred for two steps to the down stream by the timing t2 by alternatively impressing mid level (VM) and low level (VL) pulses to the electrodes V1B to V4A Moreover, a dummy signal and an OB signal are sequentially transferred to the output circuit by the horizontal electric charge transfer device during this period. The driving method up to the above is same as in the conventional solid-state imaging apparatus.

Between the timings t2 to t3, the electric potential barrier is eliminated by impressing mid level (VM) pulse to the electrode 4B, and during that time period, the signal charges (R) in one of the read two signal lines (on the down stream side) and the empty signals are added in the vertical electric charge transfer device 24.

Moreover, between the timing t2 to t3, the electric potential barrier is generated between the color signal charges (R) and other color signal charges (B) on the up stream side by impressing the low level (VL) pulse on the electrode 4A. Then, the empty signals for transferring the left-behind electric charges of the signal charges (R) on another side (on the up stream side) are generated on upper stream side of the signal electric charge (R) on the another side (on the up stream side).

Next, between the timing t3 to timing t4, the electric potential barrier is eliminated by impressing the mid level (VM) pulse on the electrode 4B, and during that time, the signal charges (R) on the one side (on the down stream) and the signal charge (R) on the another side (on the up stream) are added in the vertical electric charge transfer device 24. Also, between the timing t3 to timing t4, the electric potential barrier is kept between the color signal charges (R) and the other color signal charges (B) by keeping impressing the low level (VL) pulse on the electrode 4A, and the empty signals are further generated on the upper stream of the empty signals generated between the timings t2 to t3.

Between the timing t4 to timing t5, the empty signals are further transferred one more step, and the signal charges (R) added in the vertical electric charge transfer device 24 are transferred to the horizontal electric charge transfer device 3.

Moreover between the timing t5 to timing t6, the empty signals are further transferred one more step, and so the empty signals including the left-behind signal charge are transferred to the horizontal electric charge transfer device 3 and added to the signal charges (R) in the horizontal electric charge transfer device 3.

Thereafter, between the timing t6 to timing t7, the empty signals are further transferred one more step, and the empty signals including further left-behind signal charges are transferred to the horizontal electric charge transfer device 3 and added to the signal charges (R) in the horizontal electric charge transfer device 3.

As described in the above, according to the first embodiment of the present invention, a transfer line (empty signal line) of the empty signals is generated on up stream side of the electric charge line (actual signal line) when the signal electric charges are transferred in the vertical electric charge transfer device, the left-behind electric charges by transferring the signal electric charges can be transferred by the empty signal line and added to the signal charges on the down stream side. By doing that, it is prevented that a left-behind electric charge is mixed in the different colored signals.

Furthermore, since two adjoining transfer lines of the empty signals are generated on the up stream of the electric charge transfer line on the up stream side of the two of the signal lines to transfer the left-behind electric charge, the electric charge still left-behind by one line of the empty signals can be transferred by the another line of the empty signals so that the left-behind signal charges can be added to the signal electric charges on the down stream side. Therefore, the image defection by the color blending can be prevented with high precision.

As described in the above, the left-behind electric charges are transferred by generating plural lines of the empty signal transfer lines in the first embodiment of the present invention. An example for generating one line of the empty signal transfer line will be explained in the below as a second example. In this case, comparing to the first embodiment, the precision to prevent the image defection by the color blend will be low; however, transferring velocity can be improved. Also, since the signal electric charges are not added in the vertical electric charge transfer device 24 in the second embodiment, a risk of over capacity of the transfer channel can be eliminated.

Figure 5:
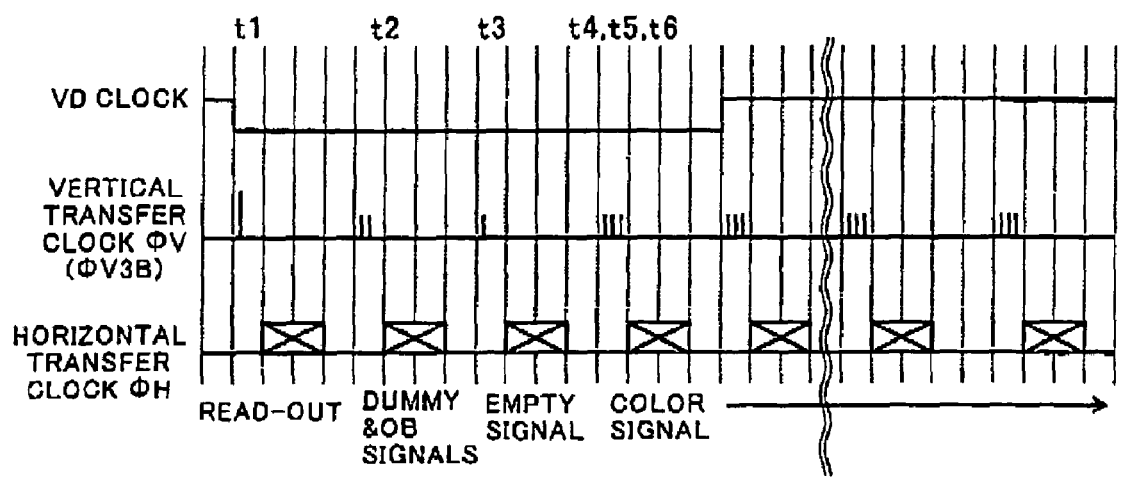
FIG. 5 is a timing chart showing driving timings of the solid-state imaging apparatus 1 according to a second embodiment of the present invention.
Figure 6:
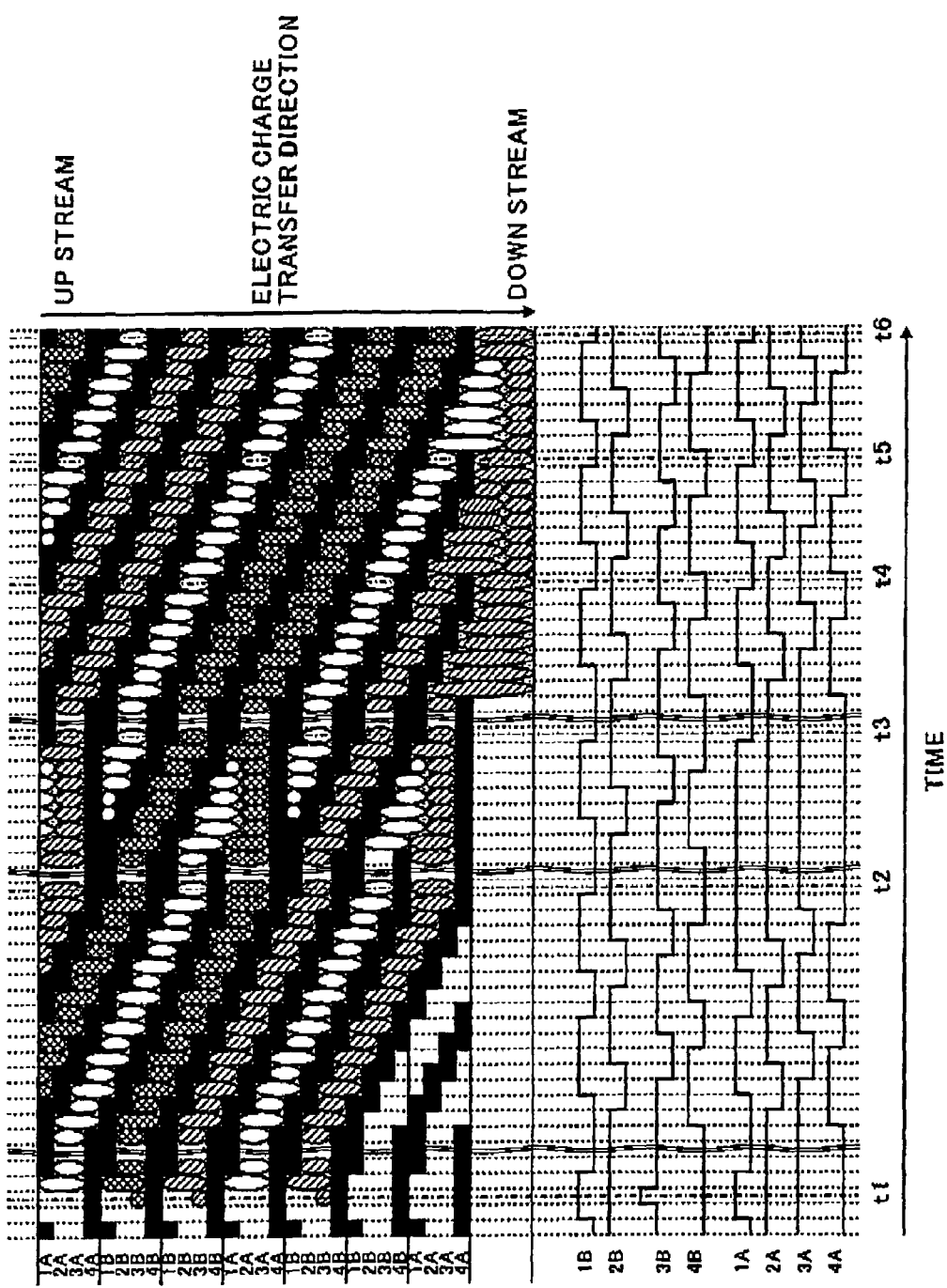
FIG. 6 is a diagram for explaining signal charge transfer by the driving timings shown in FIG. 5.

FIG. 5 is a timing chart showing driving timings of the solid-state imaging apparatus 1 according to the second embodiment of the present invention. FIG. 6 is a diagram for explaining signal charge transfer by the driving timings shown in FIG. 5. On a lower side of the drawing, an enlarged timing chart of the timing t1 to timing t6 of the driving timings shown in FIG. 5 is presented. Moreover, in the drawing, a black part represents an electric potential barrier, a white circle represents an empty signal, a hatched circle represents a signal charge (for example, a red color signal), and a cross-hatched circle represents another signal charge (for example, a blue color signal).

Moreover, the structure of the solid-state imaging apparatus 1 and the driving method from the timing t1 to the timing t3 are same as the first embodiment of the present invention.

Between the timing t3 to timing t4, the empty signals are further transferred one more step, and the empty signals including the left-behind electric charges on the down stream and the signal charges (R) on the down stream are transferred to the horizontal electric charge transfer device 3.

Between the timing t4 to timing t5, the signal electric charges are further transferred one more step, and the signal electric charges (R) on the up stream are transferred to the horizontal electric charge transfer device 3 and are added to the signal electric charges (R) in the horizontal electric charge transfer device 3.

Between the timing t5 to timing t6, the signal electric charges are further transferred one more step, and the empty signals including the left-behind electric charges on the up stream are transferred to the horizontal electric charge transfer device 3 and are added to the signal electric charges (R) on the up and down stream which had bee already added in the horizontal electric charge transfer device 3.

Next, a third embodiment of the present invention will be explained. In the third embodiment of the present invention, a signal on the up stream is read and transferred for two steps (two lines lower in the vertical direction), and then signal on the down stream is read to a packet of the read signal charge on up stream to add them.

Figure 7:
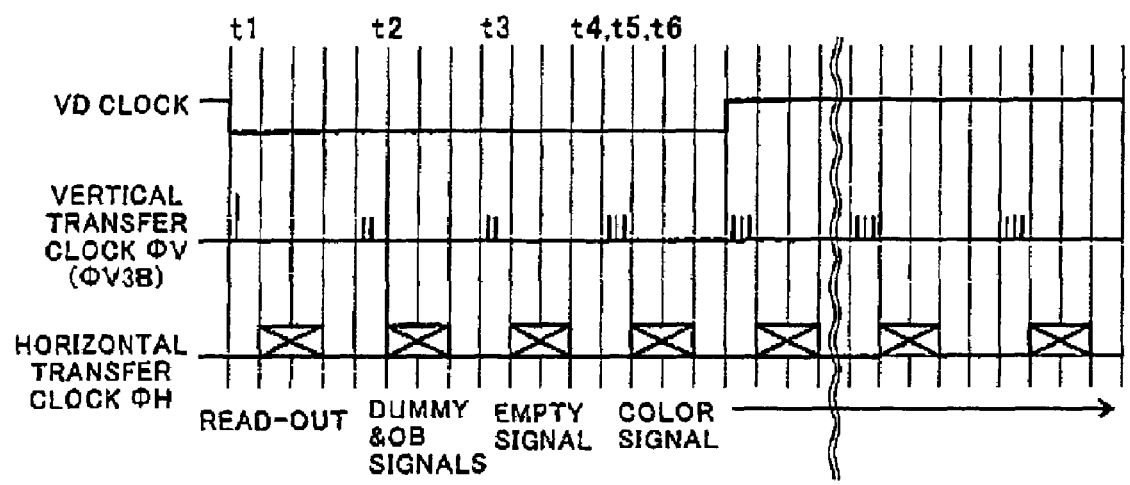
FIG. 7 is a timing chart showing driving timings of the solid-state imaging apparatus 1 according to a third embodiment of the present invention.
Figure 8:
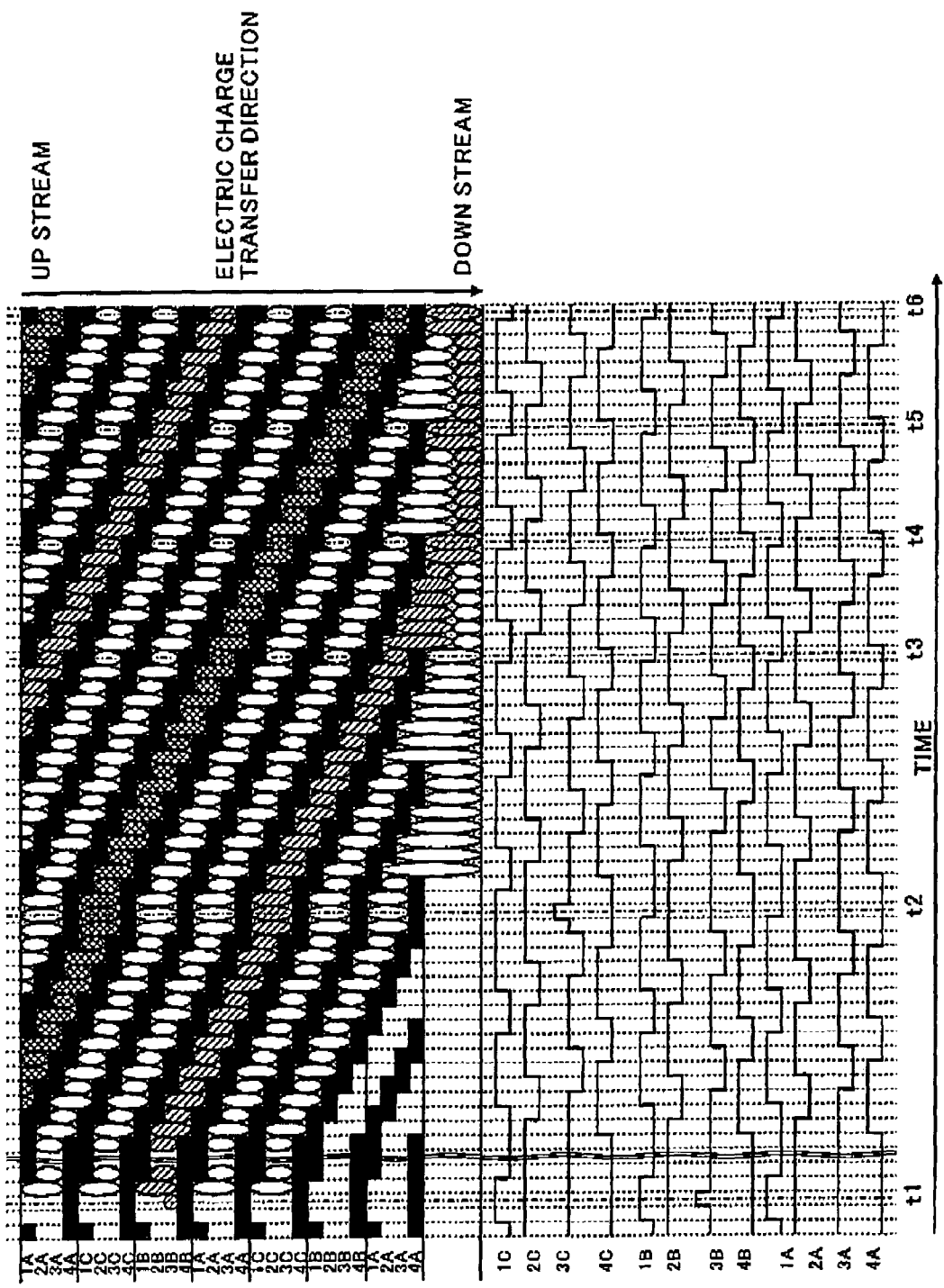
FIG. 8 is a diagram for explaining signal charge transfer by the driving timings shown in FIG. 7.

FIG. 7 is a timing chart showing driving timings of the solid-state imaging apparatus 1 according to the third embodiment of the present invention. FIG. 8 is a diagram for explaining signal charge transfer by the driving timings shown in FIG. 7. On a lower side of the drawing, an enlarged timing chart of the timing t1 to timing t6 of the driving timings shown in FIG. 7 is presented. Moreover, in the drawing, a black part represents an electric potential barrier, a white circle represents an empty signal, a hatched circle represents a signal charge (for example, a red color signal), and a cross-hatched circle represents another signal charge (for example, a blue color signal), At the timing t1, the signal charges are read from the photoelectric conversion elements 12 on one side for two third in the vertical direction to the vertical electric charge transfer device 24 via the reading unit 15 by impressing the high level (VH) pulse on the electrode V3B. Then, the read signal charges are transferred for two steps to the down stream by sequentially impressing mid level (VM) or low level (VL) pulse on electrodes V1C to V4A Moreover, a dummy signal and an OB signal are sequentially transferred to the output circuit by the horizontal electric charge transfer device during this period.

At the timing t2, the signal charges are read from the photoelectric conversion elements 12 on other side for two third in the vertical direction to the vertical electric charge transfer device 24 via the reading unit 15 by impressing the high level (VH) pulse on the electrode V3C. By that, the signal charges read at the timing t1 and the signal charges read at the timing t2 are added in the vertical electric charge transfer device 24. Then, the added signal electric charges are transferred for two steps to the down stream by sequentially impressing the mid level (VM) and the low level (VL) pulse on the electrodes V1C to V3A.

Between the timing t3 to timing t4, the signal electric charges are further transferred one more step, and the signal electric charges added in the vertical electric charge transfer device 24 are transferred to the horizontal electric charge transfer device 3.

Between the timing t4 to timing t5, the signal electric charges are further transferred one more step, and the empty signals including the left-behind electric charges are transferred to the horizontal electric charge transfer device 3 and are added to the signal electric charges in the horizontal electric charge transfer device 3.

Also, between the timing t6 to timing t6, the signal electric charges are further transferred one more step, and the empty signals including the left-behind electric charges are transferred to the horizontal electric charge transfer device 3 and are added to the signal electric charges in the horizontal electric charge transfer device 3.

As described in the above, according to the first to third embodiments of the present invention, the left-behind electric charges can be added with the original signals by generating a transfer line for transferring an empty signal on the up stream side of a transfer line for transferring the signal electric charges and by adding the signals of the two lines.

Further, by doing that, it can be prevented that the left-behind electric charge of the signal charge corresponding to the different color on the down stream blends with the signal electric charge on the up stream because the line to transfer the empty signal is generated between transfer lines of the signal electric charge corresponding to the different colors.

Figure 9:
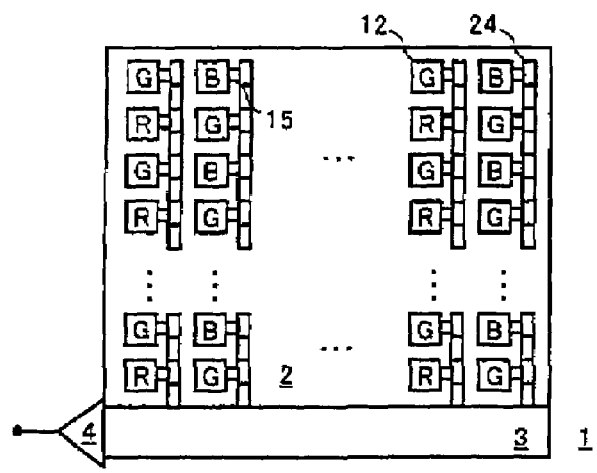
FIG. 9 is a schematic plan view showing a solid-state imaging apparatus according to a modified example of the present invention.
Figure 10:
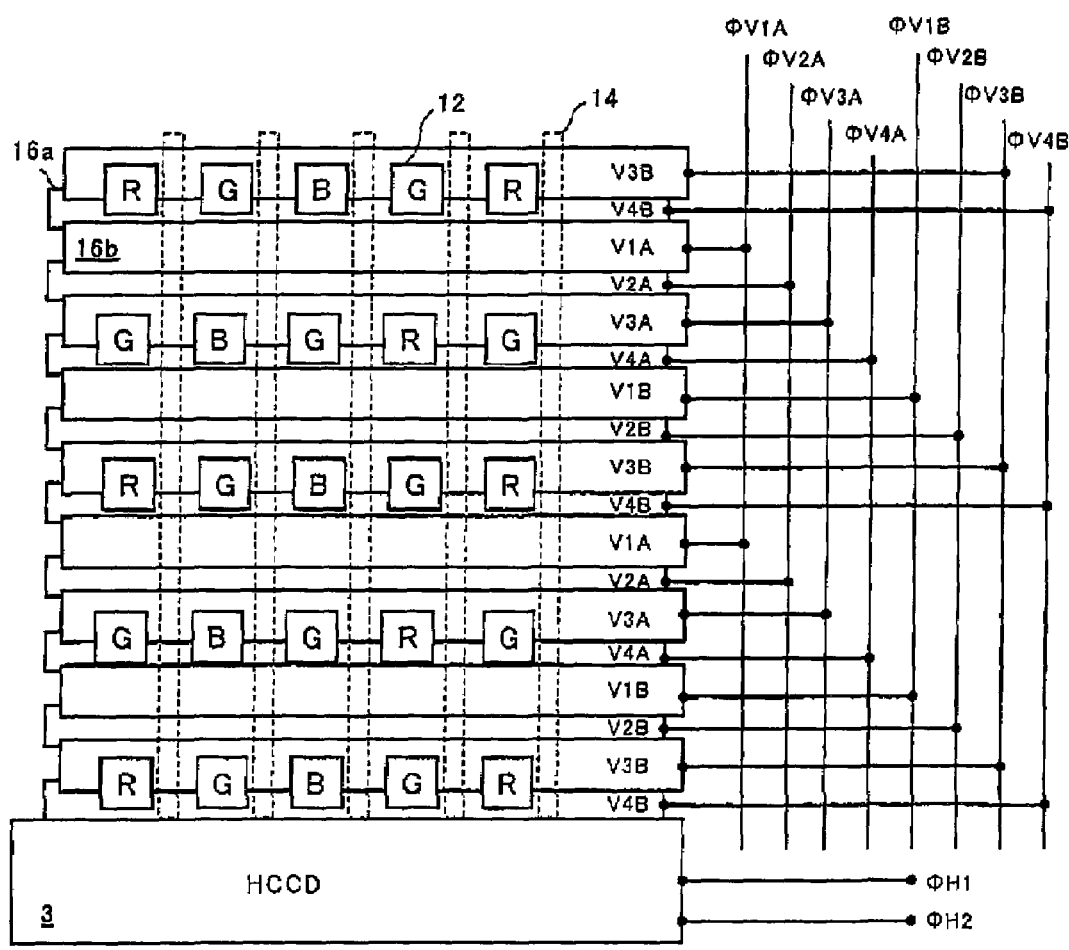
FIG. 10 is an enlarged plan view schematically showing a connecting part of the vertical electric charge transfer device 24 (a transfer channel 14 and a transfer electrode 16) and the horizontal electric charge transfer device 3 in the solid-state imaging apparatus 1 shown in FIG. 9.
Figure 11:
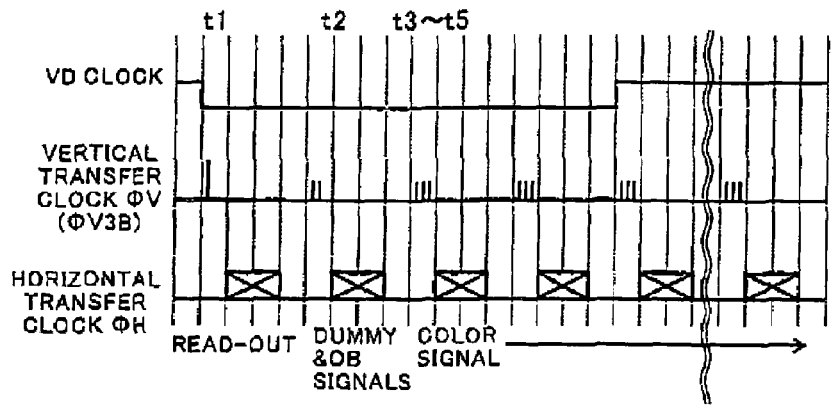
FIG. 11 is a timing chart showing driving timings of the conventional solid-state imaging apparatus.
Figure 12:
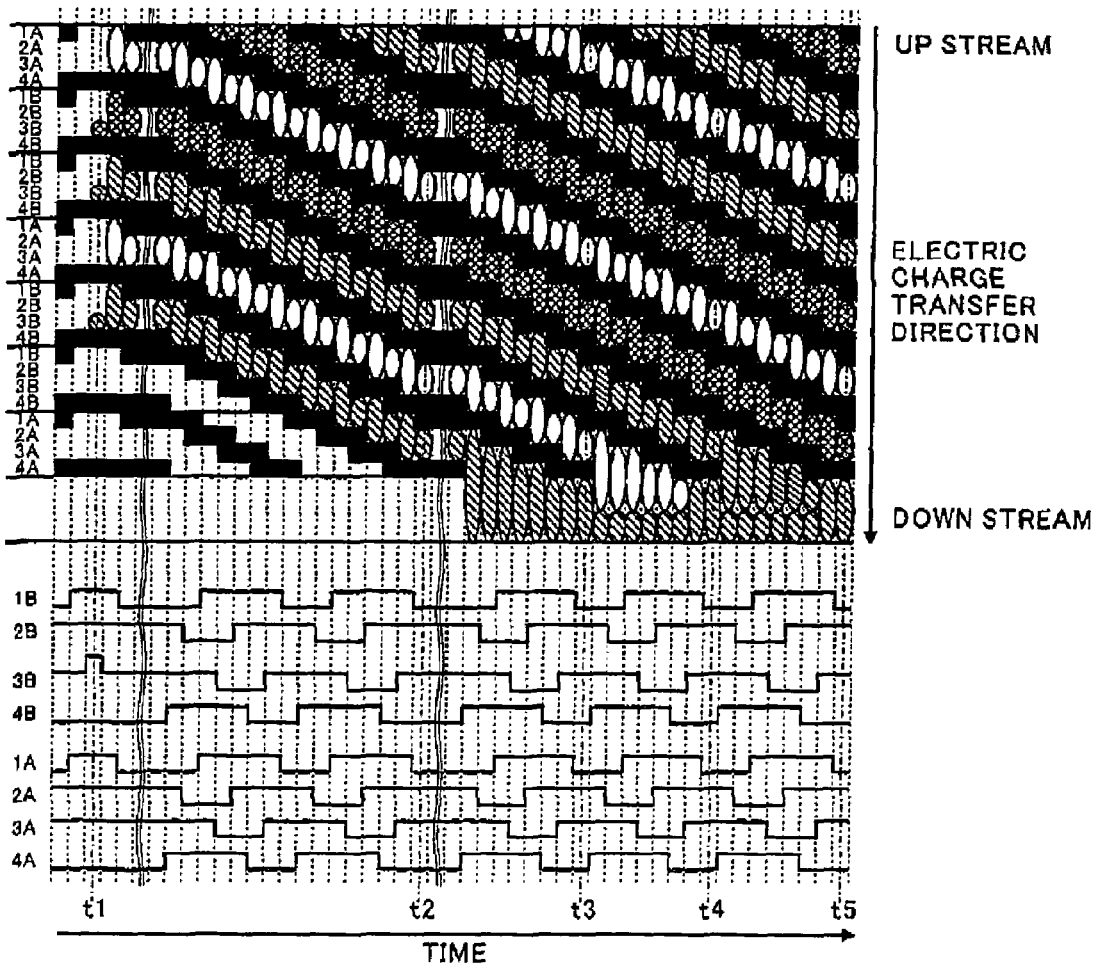
FIG. 12 is a diagram for explaining signal charge transfer by the driving timings shown in FIG. 11.

Moreover, although in the above-described embodiments, the solid-state imaging apparatus 1 has the light receiving region with the pixel interleaved arrangement structure, the embodiments of the present invention can be applied to a solid-state imaging apparatus having a light receiving region in which the photoelectric conversion elements 12 are arranged in a tetragonal matrix shown in FIG. 9 and FIG. 10.

Furthermore, although the case for culling one third of the signal lines to reduce the signal lines to two thirds of all the possible signal lines has been explained in the embodiments, it is not limited to that but the embodiments can be applied for other culling method.

The present invention has been described in connection with the preferred embodiments. The invention is not limited only to the above embodiments. It is apparent that various modifications, improvements, combinations, and the like can be made by those skilled in the art.

What is claimed is:

1. A solid-state imaging apparatus, comprising:
   a semiconductor substrate defining a two-dimensional surface;
   a multiplicity of photo electric conversion elements arranged in a plurality of rows and in a plurality of lines in a light receiving region of the semiconductor substrate and each accumulating signal electric charges;
   a vertical electric charge transfer device having a plurality of vertical electric charge transfer channels arranged vertically between rows of the photo electric conversion elements and a plurality of transfer electrodes horizontally arranged over the vertical electric charge transfer channels, wherein the vertical electric charge transfer device transfers the signal electrical charges accumulated by the photo electric conversion elements by setting a transfer line transferring vacant signals on an up stream side in a vertical direction of every transfer line transferring the signal electrical charges;
   reading out parts, each corresponding to each one of the multiplicity of the photo electric conversion elements and reading out the signal electric charges accumulated in the corresponding photo electric conversion element to the vertical electric charge transfer channels adjoining in a horizontal direction; and
   a horizontal electric charge transfer device that horizontally transfers the signal electric charges transferred by the vertical electric charge transfer device.

2. The solid-state imaging apparatus according to claim 1, wherein said transfer line transferring the signal electrical charges includes at least two lines of signal electric charges added in the vertical electric charge transfer device.

3. The solid-state imaging apparatus according to claim 1, wherein the transfer lines transferring the signal electrical charges corresponding to same color are adjacent to each other between which at least one transfer line transferring vacant signal is arranged.

4. The solid-state imaging apparatus according to claim 1, wherein said multiplicity of photo electric conversion elements are positioned on lattice points of a first lattice of a tetragonal matrix and of a second lattice of which each lattice point is positioned at a center of the first lattice in a light receiving region of the semiconductor substrate.

5. A driving method for a solid-state imaging apparatus, comprising:
   a semiconductor substrate defining a two-dimensional surface;
   a multiplicity of photo electric conversion elements arranged in a plurality of rows and in a plurality of lines in a light receiving region of the semiconductor substrate and each accumulating signal electric charges;
   a vertical electric charge transfer device having a plurality of vertical electric charge transfer channels arranged vertically between rows of the photo electric conversion elements and a plurality of transfer electrodes horizontally arranged over the vertical electric charge transfer channels:
   reading out parts, each corresponding to each one of the multiplicity of the photo electric conversion elements and reading out the signal electric charges accumulated in the corresponding photo electric conversion element to the vertical electric charge transfer channels adjoining in a horizontal direction; and
   a horizontal electric charge transfer device that horizontally transfers the signal electric charges transferred by the vertical electric charge transfer device, and the method is characterized by transferring the signal electrical charges accumulated by the photo electric conversion elements by setting a transfer line transferring vacant signals on an up stream side in a vertical direction of every transfer line transferring the signal electrical charges.

6. The driving method according to claim 5, wherein said transfer line transferring the signal electrical charges includes at least two lines of signal electric charges added in the vertical electric charge transfer device.

7. The driving method according to claim 5, wherein the transfer lines transferring the signal electrical charges corresponding to same color are adjacent to each other between which at least one transfer line transferring vacant signal is arranged.

8. The driving method according to claim 5, wherein said multiplicity of photo electric conversion elements are positioned on lattice points of a first lattice of a tetragonal matrix and of a second lattice of which each lattice point is positioned at a center of the first lattice in a light receiving region of the semiconductor substrate.

* * * * *